(12) United States Patent
Cornell et al.

(10) Patent No.: US 6,418,720 B1
(45) Date of Patent: Jul. 16, 2002

(54) METHOD AND A DEVICE FOR ENGINE BRAKING A FOUR STROKE INTERNAL COMBUSTION ENGINE

(75) Inventors: Sean O. Cornell, Gridley; Ronald D. Shinogle, Peoria; Scott A. Leman, Eureka, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/944,673

(22) Filed: Aug. 31, 2001

(51) Int. Cl.$^7$ ................................. F02D 23/00
(52) U.S. Cl. ................ 60/602; 60/605.1; 60/611; 123/321
(58) Field of Search .................. 60/605.1, 611, 60/602; 123/320, 321, 322, 323, 90.16

(56) References Cited

U.S. PATENT DOCUMENTS

| | | | |
|---|---|---|---|
| 5,146,890 A | | 9/1992 | Gobert et al. |
| 5,483,927 A | * | 1/1996 | Letang et al. ............ 123/41.12 |
| 5,560,208 A | * | 10/1996 | Halimi et al. ................. 60/608 |
| 5,867,987 A | * | 2/1999 | Halimi et al. ................. 60/602 |
| 6,305,167 B1 | * | 10/2001 | Weismann, II et al. ....... 60/602 |

FOREIGN PATENT DOCUMENTS

| | | |
|---|---|---|
| CH | A-118905 | 2/1926 |
| CH | A2162580 | 8/1984 |
| EP | 193142 | 2/1985 |
| EP | 269605 | 10/1986 |

* cited by examiner

*Primary Examiner*—Hoang Nguyen
(74) *Attorney, Agent, or Firm*—Mike R. Huber

(57) ABSTRACT

The invention relates to a method and an arrangement for engine braking a four-stroke internal combustion engine. The engine has for each cylinder (2) at least one inlet valve (7) and at least one exhaust valve (9) for controlling communication between a combustion chamber (5) in the cylinder (2) and an inlet system (8) and an exhaust system (10) respectively. In accordance with the invention, the arrangement also establishes communication between the combustion chamber (5) and the exhaust system (10) in conjunction with the exhaust stroke and also when the piston (3) is located in the proximity of the its bottom-dead-center position after the inlet stroke and during the latter part of the expansion stroke. Communication of the combustion chamber (5) with the exhaust system (10) is effected upstream of the throttling device (13) provided in the exhaust system, this throttling device being operative to at least maintain the flow though exhaust system (10) during an engine braking operation, therewith not cause an increase in the pressure upstream of the throttling device (13).

17 Claims, 4 Drawing Sheets

Fig_1_

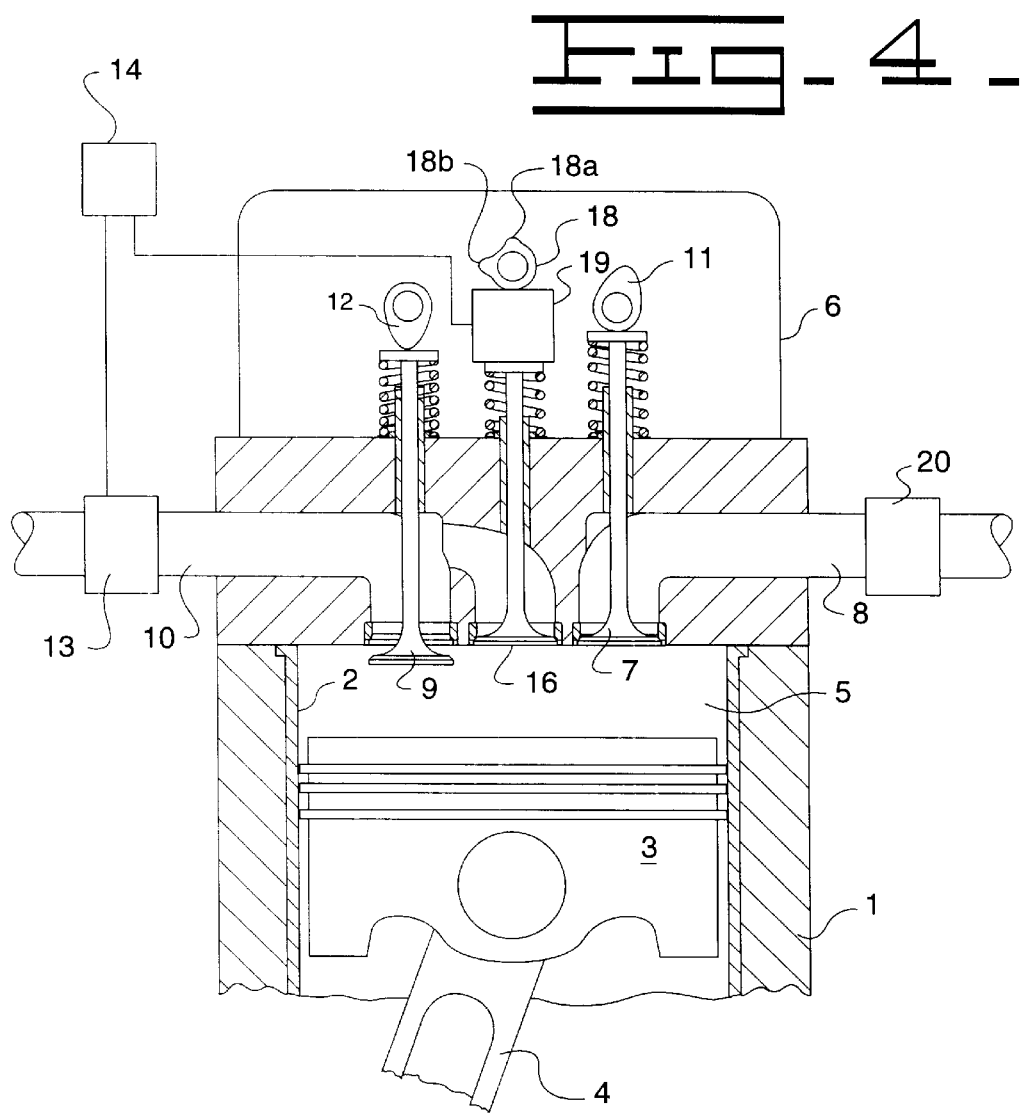
Fig. 4
Fig. 5
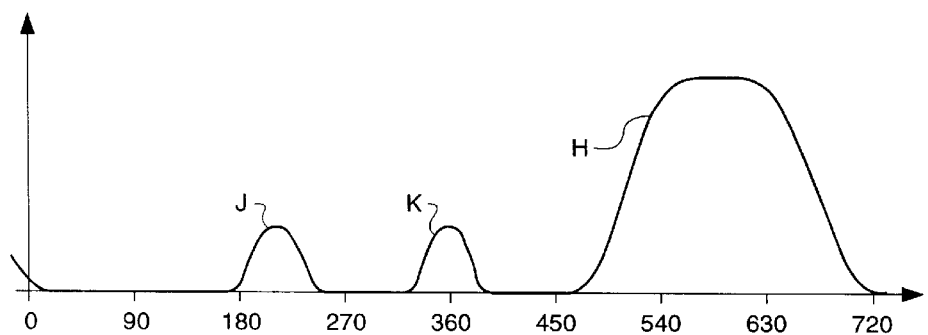

METHOD AND A DEVICE FOR ENGINE BRAKING A FOUR STROKE INTERNAL COMBUSTION ENGINE

TECHNICAL FIELD

The present invention is a method and device for engine braking an internal combustion engine. Specifically, the present invention provides method and apparatus for controlling a throttling device located in the engine's exhaust flow.

BACKGROUND

The engine of a vehicle is often used as an auxiliary brake to retard vehicle speed. This particularly applies to heavy vehicles, such as trucks and buses. With regard to heavy vehicles of this category, developments over recent years have resulted in engines of much greater power with unchanged cylinder volume. As a result, the average speed at which such vehicles are driven uphill has increased considerably, meaning that the availability of greater braking power when driving downhill is desirable. Normally, some form of throttle valve is incorporated in the exhaust system with the intention of achieving improved engine braking power. This power, however, is relatively low and often less than half the driving power of the engine.

Furthermore, the resistance of such heavy vehicles to driving has decreased over recent years, meaning that the wheel brakes of the vehicles are subjected to greater loads. When driving in hilly terrain, the wheel brakes should be used as little as possible, primarily for safety reasons. The average speed of the vehicle in hilly terrain is therefore greatly influenced by the available engine braking power, which increases the requirement for a more effective engine brake that will also be capable of reducing wear and tear on the wheel brakes and thereby improve running economy.

A variety of suggestions have, therefore, been made regarding methods and apparatuses for increasing the engine braking power of four stroke internal combustion engines.

In EP-A-193142 there is described a method and an apparatus, where a separate valve is used to establish connection between the combustion chamber and the exhaust system. During engine braking operation this valve is constantly open.

According to GB-A2162580 engine braking power is increased by a mechanism which prevents the exhaust valve from closing completely during engine braking operation. This means that the exhaust valve is constantly open during engine braking operation. A similar apparatus is shown in EP-A-269605.

CH-A-118905 describes an engine with a moveable camshaft.

During engine braking operation the inlet valve is constantly closed, while the exhaust valve is opened shortly before the piston reaches its top-dead-center position, and this cycle is repeated for each revolution of the crank shaft. Thus, during engine braking operation this engine works in a sort of two stroke mode.

In U.S. Pat. No. 5,146,890 to Gobert et al, a method of braking is disclosed which requires one to restrict the exhaust flow when entering the braking mode ideally, this is performed with a variable geometry turbocharger; however, by measuring the restriction turbocharger burnout can occur.

SUMMARY OF THE INVENTION

A method for engine braking with a four-stroke internal combustion engine includes each engine cylinder (2) having at least one inlet valve (7) and at least one exhaust valve (9) for controlling communication between a combustion chamber (5) in the cylinder (2) and an inlet system (8) and an exhaust system (10) respectively. The communication is characterized by opening the communication between the combustion chamber (5) and the exhaust system (10) when the piston (3) is located in the proximity of its bottom-dead-center position subsequent to the inlet stroke, by closing the communication when the piston (3) has performed less than half the compression stroke and holding the communication closed during part of the compression stroke, by opening the communication when the piston (3) has performed more than half the compression stroke, and by holding the communication open during the remaining part of the compression stoke and during at least a part of the expansion stroke. The communication of the combustion chamber (5) with the exhaust system (10) being effected upstream of a throttling device (13) mounted in the exhaust system and for engine braking being actuated to at least maintain the flow through the exhaust system (10) and therewith not cause an increase in pressure upstream of the throttling device (13).

In another embodiment of the present invention, an arrangement for engine braking with a four-stroke internal combustion engine comprises each cylinder (2) having at least one inlet valve (7) and at least one exhaust valve (9) for controlling communication between the combustion chamber (5) of the cylinder and an inlet system (8) and an exhaust system (10) respectively. The communication is characterized in that the arrangement includes means for opening, during an engine braking operation, a communication between the combustion chamber (5) and the exhaust system (10) when the piston (3) is located in the proximity of its bottom-dead-center position subsequent to the inlet stroke and for closing said communication when the piston (3) has performed less than half the compression stroke; in that means are provided for opening, during an engine braking operation, the communication when the piston (3) has performed more than half the compression stroke and for holding the communication open during the remaining part of the compression stroke and during at least part of the expansion stroke. Further, there is provided in the exhaust system (10) downstream of the connection of the combustion chamber (5) with the exhaust system (10) a throttling device (13) which is operative during an engine braking operation to at least maintain the flow through the exhaust system (10) and therewith not cause an increase in pressure upstream of the throttling device (13).

BRIEF DESCRIPTION OF THE DRAWINGS

The invention will now be described in more detail with reference to the accompanying drawings, in which

FIG. 4 is a schematic sectional view corresponding to FIG. 1 but illustration an alternative embodiment of the invention arrangement; and FIG. 5 is a diagram corresponding to FIG. 2 but relating to the embodiment illustrated in FIG. 4.

DETAILED DESCRIPTION

Figure 1:
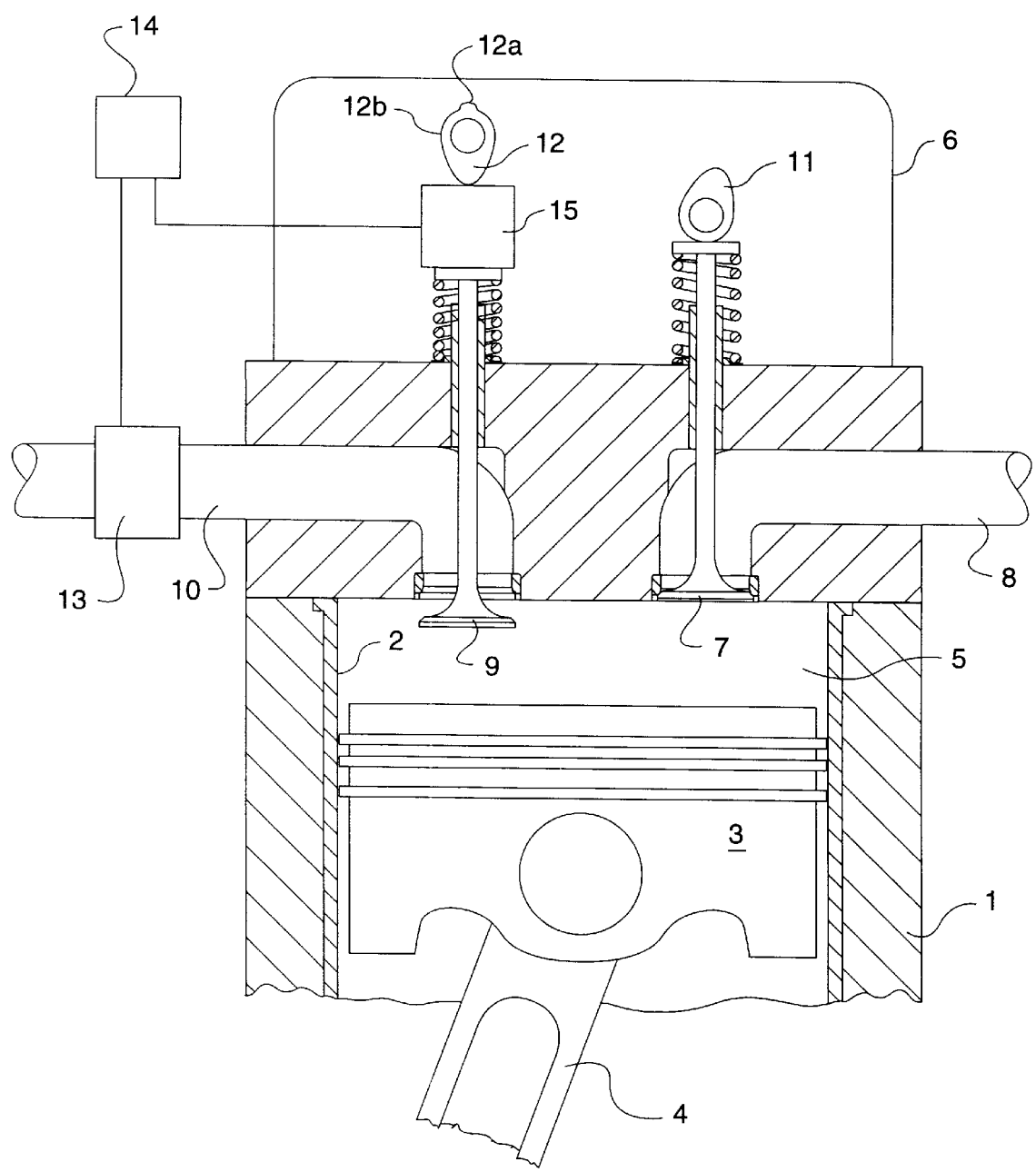
FIG. 1 is a schematic, sectional view of a cylinder forming part of an internal combustion engine provided with an inventive arrangement.

FIG. 1 is a schematic illustration of a four-stroke internal combustion engine which is intended for carrying out the inventive method and which to this end is provided with an arrangement according to a first embodiment of the invention. The engine illustrated in FIG. 1 includes an engine block 1 having a cylinder 2 which accommodates a piston 3 which is connected to a crankshaft (not shown) by means of a connecting rod 4. Located above the piston 3 in the cylinder 2 is a combustion chamber 5 which is closed by means of cylinder head 6. Mounted in the cylinder heads 6 is an inlet valve 7 which controls the connection between the combustion chamber 5 and an inlet system 8, of which only a part is shown. The cylinder head 6 also accommodates an exhaust valve 9, which controls communication between the combustion chamber 5 and an exhaust system 10, of which only a part is shown. The movement of the inlet valve 7 and the exhaust valve 9 is controlled by cam shafts provided with cams 11 and 12 respectively. Remaining part of the engine are of minor significance to the invention and are therefore not described in detail here.

When the engine is used as a power source, the function of the engine does not differ essentially from what is known in other four-stroke internal combustion engines. What may differ somewhat is that the time-point at which the exhaust valve is closed after the engine exhaust stroke is changed towards a smaller valve overlap so that said overlaps will not be excessive when the engine is use for engine braking purposes. Similarly, it may also be necessary to arrange for the inlet valve to be closed at a slightly earlier time point. This is described in more detail herebelow When free-running a four-stroke internal combustion engine, i.e. when the wheels of the vehicle drive the engine, a certain braking effect occurs as a result of the internal resistance in the engine, inter alia due to friction. This braking effect is relatively small, however, and has been further reduced in modern engines. A well known method of improving the engine braking power, is to mount a throttle device, for instance a butterfly valve, in the exhaust system. When the valve is closed, an overpressure is generated in the exhaust system which causes the work to increase during the exhaust stroke, with a commensurate increase in braking power.

It is also known that braking power can be increased by placing the combustion chamber in the cylinder in communication with the exhaust system during the latter part of the compression stroke and during a smaller or greater part of the expansion stroke. This can be achieved, either by opening the conventional exhaust valve or with the aid of a separate valve. As a result, air compressed in the combustion chamber during the compression stroke will flow partially into the exhaust system, meaning that a large part of the compression work carried out during the compression stroke is not recovered during the expansion stroke, therewith increasing the braking power. One known arrangement for carrying out this method utilizes the conventional exhaust valve and the exhaust valve operating cam is provided with an additional cam lobe which is operative to achieve the additional opening of the exhaust valve. The extent to which the exhaust valve is lifted by this additional lobe is relatively slight, and when the engine is used as a power source the valve clearance is sufficiently large to render the additional lobe inoperative. When braking vehicle speed with the aid of the engine, a hydraulic valve-clearance adjuster is brought into operation, such as to reduce the valve clearance, therewith bringing the additional lobe into operation. The extent to which the exhaust valve is lifted during the conventional valve-opening sequence will at the same time be correspondingly greater, however, and this must be taken into account so that problems will not occur by impact of the exhaust valve against the piston. The exhaust system 10 of the engine illustrated in FIG. 1 also includes a throttle member 13. The throttle member 13 is controlled by a regulating means 14, which is also employed to control a changing device 15 which, when activated, is operative to change the engagement conditions between the cam shaft 12 and the valve mechanism by means of which the exhaust valve 9 is controlled. In the FIG. 1 embodiment this changing means comprises a hydraulic element by means of which the regulating means 14 can be adjusted or switched between two mutually different lengths. Naturally, the length of the valve- mechanism can also be changed in some other way, for instance mechanically.

Figure 2:
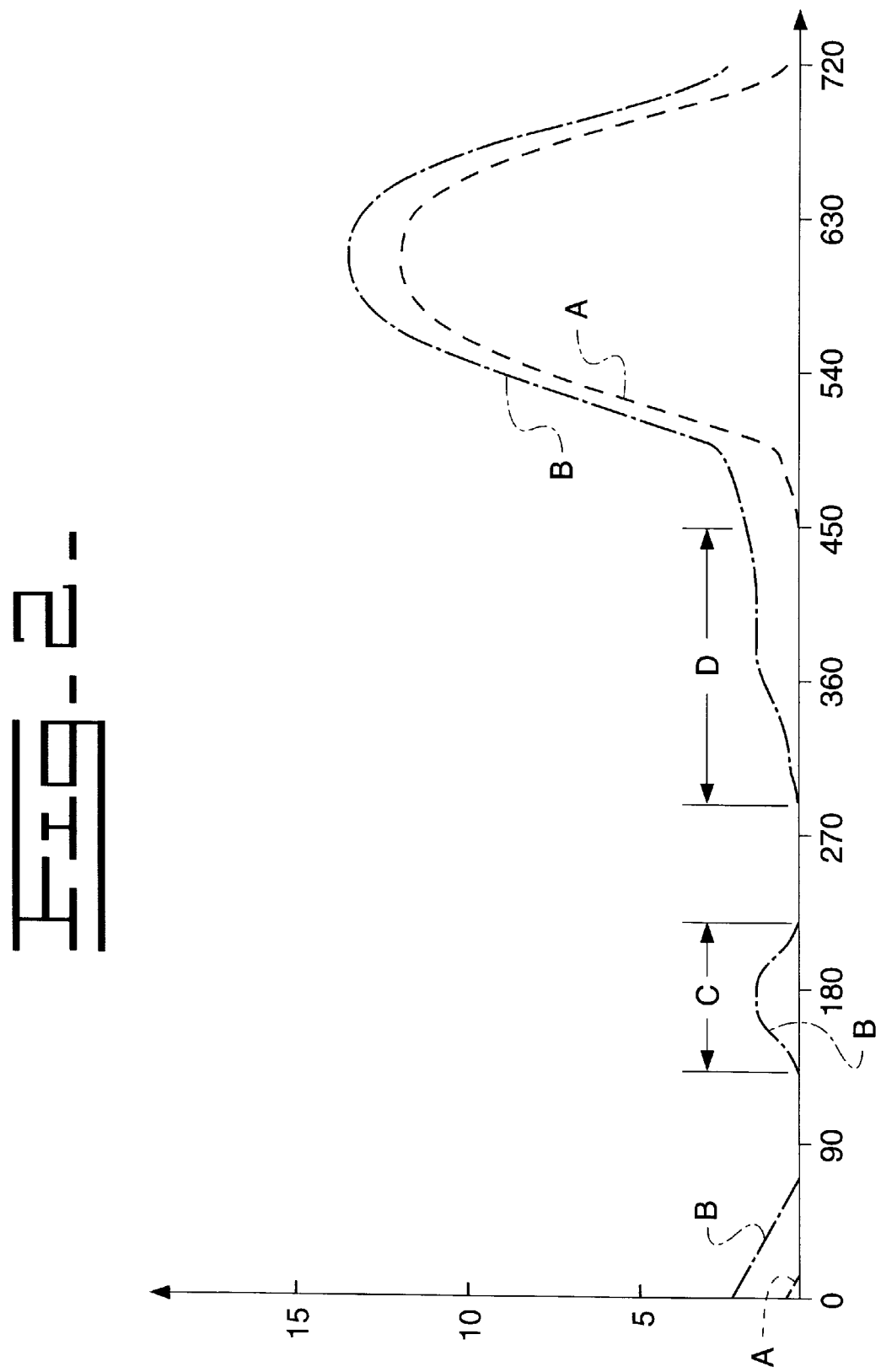
FIG. 2 is a diagrammatic illustration of the lifting height of the exhaust valve of an engine according to FIG. 1 in normal engine operation and when engine braking.

For the purpose of achieving the desired function when engine braking, the cam 12 controlling movement of the exhaust valve 9 is configured in the manner best seen from FIGS. 1 and 2. FIG. 2 illustrates the configuration of the cam 12 with the aid of a diagram illustrating the movements performed by the exhaust valve 9 under the influence of the cam 12. In this respect, the diagram illustrates with the broken curve A movement of the exhaust valve 9 when the engine is used as a power source, whereas the chain-line curve B illustrates movement of the exhaust valve 9 when engine braking.

As will be seen from the curve A, when the engine is used as a power source the exhaust valve 9 is closed shortly after 0°, i.e. shortly after the top-dead-center position of the piston 3 after the exhaust stroke. The exhaust valve 9 can also be closed at 0° i.e. in the top-dead-center position of the piston 3 after the exhaust stroke. The exhaust valve 9 is then held closed for the remainder of the inlet stroke and during the whole of the compression stroke, and begins to open after approximately half the expansion stroke has been completed, so as to be substantially fully open at 540°, i.e. at the beginning of the exhaust stroke. Closing of the exhaust valve 9 commences during the exhaust stroke, and is terminated or almost terminated at 720°, i.e. at the end of the exhaust stroke, where after the sequence is repeated.

When engine braking, the changing device 15 is activated with the aid of the regulating means 14, so as to slightly increase the total length of the valve mechanism for activation of the exhaust valve 9. In this case, movement of the valve 9 will be different, due to the fact that the cam 12 will act on the exhaust valve 9 with other lobes apart from the conventional exhaust lobe responsible for the vale movement described in the preceding paragraph. The remaining lobes comprise a pressure-increase lobe 12a which results in movement of the valve 9 with in the region C in FIG. 2, and a pressure-lowering lobe 12b which results in movement of the valve 9 with in the region D in FIG. 2,. As will be seen from FIG. 2, the region C, which can be designated the pressure-increase region, is positioned in the latter part of the inlet stroke and the first part of the compression stroke, i.e. around an immediately after the bottom-dead-center position of the piston 3 subsequent to the inlet stroke. As will be seen from the diagram in FIG. 2, opening of the valve 9 in this region, in response to action of the lobe 12a, is relatively small in relation to the convention opening of the valve during the exhaust stroke. During this opening, the gas in the exhaust system 10 upstream of the throttle device 13 will flow back into the combustion chamber 5 and increase the pressure therein. When the exhaust valve 9 is closed after the pressure-increase region 7, the pressure in the combustion chamber 5 will therefore be higher than it would have been if the exhaust valve 9 had not been opened within the pressure-increase region C. Consequently, the compression work effected during the compression stroke will be higher. At the same time, the pressure peaks and the mean pressure in the exhaust system 10 will be lowered, thereby reducing the risk of unintentional opening of the exhaust valve 9 as a result of an excessively high pressure in the exhaust system 10.

Figure 3:
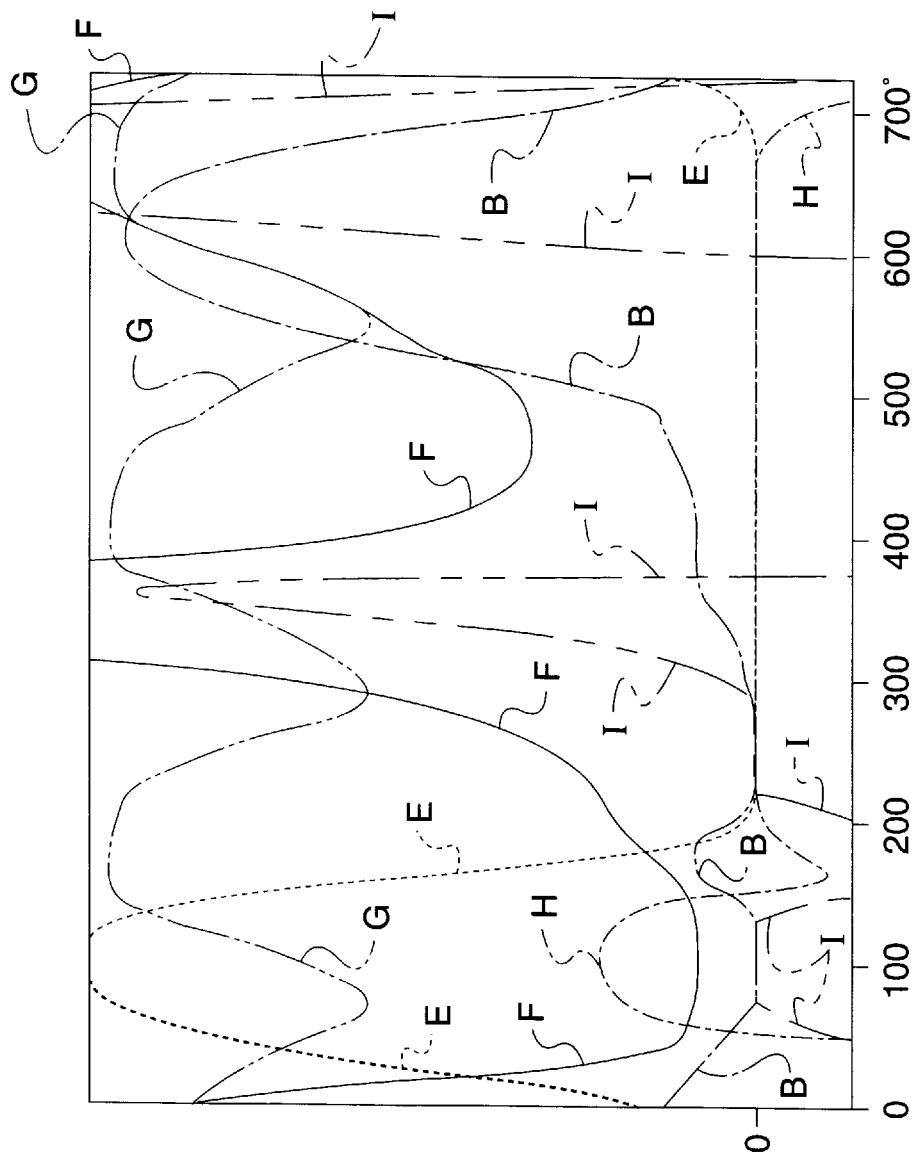
FIG. 3 is a diagram which illustrates the movements performed by the exhaust valve and the inlet valve in the cylinder according to FIG. 1 and also the pressure in the cylinder and an exhaust branch pipe in a in-line six-cylinder engine having a two-part exhaust branch pipe, and also illustrates the gas flow through the inlet valve and the exhaust valve.

The pressure-lowering lobe 12b on the cam 12 operative to open the valve within the region D, i.e. during the latter part of the compression stroke and the first part of the expansion stroke, improves the engine braking power by virtue of the fact that a large part of the gas compressed in the combustion chamber 5 during the compression stroke is released into the exhaust system 10, thereby decreasing the expansion work effected during the expansion stroke. The aforedescribed is also illustrated by the diagram given in FIG. 3. This diagram shows the curve B which has been described in more detail above with reference to FIG. 2 and which illustrates the movements performed by the exhaust valve 9. FIG. 3 also shows a curve E representative of the movements performed by the inlet valve 7, a curve F representative of the pressure in the combustion chamber 5, and a curve G representative of the pressure in the exhaust system 10 upstream of the throttle device 13. FIG. 3 includes two further curves H and I which represent respectively the gas flow through the inlet valve 7 and through the exhaust valve 9. It will be seen from the curves that the pressure-increasing lobe 12a responsible for the region C in FIG. 2 and opening of the exhaust valve 9 is operative to cause a pressure increase in the cylinder. This is clearly shown by the curve F, and curve I also shows that this opening of the exhaust valve 9 results in a pronounced inflow of gas into the combustion chamber 5 from the exhaust system 10. This constitutes so-called internal charging which improves the engine braking power.

FIG. 4 illustrates another embodiment of an inventive arrangement, those components which have direct correspondence with the components illustrated in FIG. 1 being identified by the same reference signs. In addition to the inlet valve 7 and the exhaust valve 9, the embodiment according to FIG. 4 also includes an additional valve 16 which is operative to place the combustion chamber 5 in communication with the exhaust system 10, with the aid of a passageway 17. This additional valve 16 is controlled by an additional valve mechanism which, as shown, includes a cam 18 having two lobes 18a and 18b corresponding to the lobes 12a and 12b on the cam 12 of the FIG. 1 embodiment. There is also provided a regulating means 19 which, under the influence of the regulating means 14, renders the cam 18 and the lobes 18a and 18b to be inoperative when the engine is as a power source. When engine braking , the regulating means 14, with the aid of the regulating means 19, causes the cam 18 to be brought into function, so that the additional valve 16 will be opened and closed by the lobes 18a and 18b.

The diagram in FIG. 5 illustrates how the combustion chamber 5 is placed in communication with the exhaust system 10 of the engine illustrated in FIG. 4. In this case, the curve H of the diagram illustrates conventional opening of the exhaust valve 9 with the aid of the cam 12. As illustrated by FIG. 5, the exhaust valve 9 is therewith closed shortly after the piston 3 has passed its top-dead-center position subsequent to the exhaust stroke. The curve part J in the diagram corresponds to the opening of the additional valve 16 caused by the lobe 18a. This opening of the valve is commenced shortly before the piston reaches it bottom-dead-center position subsequent to the suction stroke, and the valve 16 is then held open during the first part of the compression stroke. The valve 16 is then held closed but is again opened by the lobe 18b during the latter part of the compression stroke, as illustrated by the curved part K. The valve 16 is then held open during the latter part of the compression stroke and during the first part of the expansion stroke. The valve 16 is then held closed during the remainder of the expansion stroke and also during the exhaust stroke and the major part of the inlet stroke, whereafter the sequence is repeated.

Because the additional valve 16 is closed during the expansion stroke prior to the exhaust valve 9 being opened, as illustrated by the curve parts K and H, and additional increase in engine braking power is obtained, since the expansion work is further decreased hereby due to a reduction in the reflow of gas from the exhaust system 10 to the combustion chamber 5.

The embodiment illustrated in FIG. 4 also includes a charging device 20 incorporated in the inlet system 8. The charging device 20 may be driven mechanically or may consist of the compressor of a turbo compressor, the turbine of which can then form the throttle device 13 in the exhaust system 10. Thereby a turbine of variable geometry may be used, i.e. a turbine with guide vanes in the turbine inlet. This enables the requisite throttling effect to be achieved with the aid of the guide vanes. The turbo compressor may comprise the conventional engine turbo-compressor, although it is also possible to use a separate turbo compressor solely for engine braking purposes.

Although the above system actuates the valves mechanically, with cams, a hydraulic system could also be used. Specifically, the valves 7, 9 could be actuated with a system in which a high pressure fluid, such as oil, is used to actuate a plunger to move the valve. The oil flow can be electronically controlled, with a solenoid for example. The above system could also use a combination of cam and hydraulic operation.

Further, when the above system uses a variable geometry turbocharger as the throttling device 13 to throttle exhaust flow, a potential turbocharger/compressor overspeed problem exists. Specifically, when a variable speed turbocharger 13 closes its vanes to increase back pressure and increase the charge generated by the compressor, in an attempt to get more braking power, the turbocharger 13 spins faster. Subsequently, by generating more braking power, more back pressure is created which causes the turbocharger 13 to spin even faster, which in turn results in faster compressor speed. This then builds even more cylinder charge and therefore, more braking power; again leading to even faster turbocharger 13 speed. As can be seen, this leads to a vicious cycle which can result in turbocharger/compressor 13 overspeed and burnout.

It has been suggested that one should throttle/restrict the exhaust flow with a throttling device 13, such as a variable geometry turbocharger, as soon as a braking event begins; however, as stated above, this can lead to an overspeed condition causing turbocharger/compressor 13 burnout. Therefore, in order to avoid the overspeed problem, when a braking event occurs, the current throttling position of the throttling device 13 should remain constant or actually be decreased by opening the restriction. The throttling device 13 is controlled by the regulating means 14, or by an electronic control module (ECM), which is also capable of determining whether a burn out/overspeed condition exists and, if so, opening the restriction.

It should be noted that maintaining the throttling position of the throttling device 13 does not guarantee that the pressure or flow will not increase. For example, if the turbocharger 13 speed and exhaust back pressure are low before entering a braking mode. The flow and pressure may increase even though the throttling device 13 remain constant. This may be because the braking mode increases exhaust temperature which can increase turbocharger speed which then increases the flow because the compressor is generating more charge. In short, pressure and flow may be influenced by man than just the throttling device however, the increase should not continue in the event that it occurs; instead the system will simply adjust to a new steady state. Therefore, at least keeping the restriction constant should avoid an overspeed condition.

INDUSTRIAL APPLICABILITY

The present invention avoids overspeed or burnout problems associated with engine braking by controlling the throttling device 13 so that when entering a braking event, the restriction is not increased. Instead, the ECM or regulating means 14 monitors a possible overspeed/burnout condition that may exist with a variable geometry turbocharger 13 and either leaves the throttling device 13 at its current restriction location or actually opens the restriction.

The present invention may be best understood with an example. When a truck is driving up a hill, the exhaust flow will most likely already be throttled by variable geometry turbocharger 13 in order to increase compressor speed and generate more cylinder charge during this high load condition. As the truck crests the hill and enters in to a braking mode, it would not be desirable to further throttle/restrict the exhaust flow because this will directly lead to the overspeed condition. Additionally, it may not be possible to further restrict the flow because the variable geometry turbocharger 13 may already be at maximum restriction. Instead, because the flow is already being restricted by the variable geometry turbocharger, conditions could remain the same or to avoid overspeed conditions, the throttling/restriction of the exhaust flow could be reduced by opening the vanes of the variable geometry turbocharger 13.

Other aspects and advantages of this invention can be obtained from a study of the drawings, the disclosure and the appended claims.

What is claimed is:

1. A method for engine braking with a four-stroke internal combustion engine, said engine having for each cylinder (2) at least one inlet valve (7) and at least one exhaust valve (9) for controlling communication between a combustion chamber (5) in the cylinder (2) and an inlet system (8) and an exhaust system (10) respectively, characterized by opening a communication between the combustion chamber (5) and the exhaust system (10) when the piston (3) is located in the proximity of its bottom-dead-center position subsequent to the inlet stroke, by closing said communication when the piston (3) has performed less than half the compression stroke and holding the communication closed during part of the compression stroke, by opening said communication when the piston (3) has performed more than half the compression stroke, and by holding said communication open during the remaining part of the compression stoke and during at least a part of the expansion stroke, said communication of the combustion chamber (5) with the exhaust system (10) being effected upstream of a throttling device (13) mounted in the exhaust system and for engine braking being actuated to at least maintain the flow through the exhaust system (10) and therewith not cause an increase in pressure upstream of said throttling device (13).

2. A method according to claim 1, characterized by closing the exhaust valve (9) shortly after the piston (3) has passed its top-dead-center position at the end of the exhaust stroke.

3. A method according to claim 1, characterized by closing said communication between the combustion chamber (5) and the exhaust system (10) when the piston (3) has performed less than half the expansion stroke.

4. The method of claim 1 in which the throttle of the flow through the exhaust system (10) is decreased; thereby reducing the pressure upstream of said throttling device (13).

5. An arrangement for engine braking with a four-stroke internal combustion engine, said engine having for each cylinder (2) at least one inlet valve (7) and at least one exhaust valve (9) for controlling communication between the combustion chamber (5) of the cylinder and an inlet system (8) and an exhaust system (10) respectively, characterized in that the arrangement includes means for opening during an engine braking operation a communication between the combustion chamber (5) and the exhaust system (10) when the piston (3) is located in the proximity of its bottom-dead-center position subsequent to the inlet stroke and for closing said communication when the piston (3) has performed less than half the compression stroke; in that means are provided for opening during an engine braking operation said communication when the piston (3)has performed more than half the compression stroke an for holding said communication open during the remaining part of the compression stroke and during at least part of the expansion stroke; and in that there is provided in the exhaust system (10) downstream of the connection of the combustion chamber (5) with the exhaust system (10) a throttling device (13) which is operative during an engine braking operation to at least maintain the throttle of the flow through the exhaust system (10) and therewith not increase pressure upstream of the throttling device (13).

6. An arrangement according to claim 4, characterized in that the means for opening and closing said communication between the combustion chamber (5) and the exhaust system (10) comprises the exhaust valve (9), two additional lobes (12a, 12b) which have a small lift height and which are located on the engine cam (12) operative to control movement of the exhaust valve (9), and a changing means (15) provided in the valve mechanism between the cam (12) and the exhaust valve (9), and a changing means (15) provided in the valve mechanism between the cam (12) and the exhaust valve (9) and operative to change the effective length of the valve mechanism during an engine braking operation in a manner such that the additional lobes (12a, 12b) will result in opening of the exhaust valve (9) solely during an engine braking operation.

7. An arrangement according to claim 4, characterized in that the means for opening and closing said communication between the combustion chamber (5) and the exhaust system (10) comprise an additional valve (16) in the combustion chamber (5), a valve mechanism (18) for causing the valve (16) to open and close, and a regulation means (14, 19) for controlling the valve mechanism in a manner such that said mechanism will only actuate the additional valve (16) during an engine braking operation.

8. An arrangement according to claim 4, characterized in the throttling device (13) has the form of an adjustable butterfly valve, and in that the arrangement includes a further regulating means (14) which is operative to control movement of the butterfly valve (13) in a manner to achieve desired throttling during an engine braking operation.

9. An arrangement according to claim 4, characterized in that the throttling device (13) comprises an exhaust-driven turbine.

10. A method of engine braking for an internal combustion engine which includes a throttling device (13) located in the exhaust stream of an engine cylinder (2) and moveable between a first, open position and a second, maximum restriction position, whererin said throttling device (13) is located at a third position between said first position and said second position, the method comprising:

entering an engine braking mode; and moving said throttling device (13) to a fourth position located between said third position and said first position.

11. A method of engine braking for an internal combustion engine which includes a variable geometry turbocharger (13) located in the exhaust stream of an engine cylinder (2) and said variable geometry turbocharger (13) having vanes moveable between a first, open position and a second, maximum restriction position, wherein said vanes are located at a third position between said first position and said second position, said vanes' position being controlled by a regulating device (14), the method comprising:

entering an engine braking mode;

determining an overspeed condition of said variable geometry turbocharger (13);

sending a signal from said regulating device (14) to said turbocharger (13) to control the position of said vanes; moving said vanes to a fourth position located between said third position and said first position.

12. The method of claim 11 wherein determining an overspeed condition of said turbocharger (13) includes measuring a speed of said turbocharger (13).

13. An arrangement for engine braking for an internal combustion engine comprising:

at least one engine cylinder (2) including at least one intake valve (7) and at least one exhaust valve (9);

a variable geometry turbocharger (13) located in the exhaust stream of said cylinder (2), said variable geometry turbocharger (13) having vanes moveable between a first, open position and a second, maximum restriction position, said vanes being located at a third position between said first and said second position;

a regulating device (14) to determine an overspeed condition of said variable geometry turbocharger (13) and control the position of said vanes in response to said overspeed determination such that when said engine enters a braking mode said regulating device (14) moves said vanes to a fourth position located between said third position and said first position.

14. The arrangement of claim 13 wherein said fourth position is the same as said third position.

15. The arrangement of claim 13 wherein said third position is the same as said second position.

16. The arrangement of claim 13 wherein said first, second, third and fourth positions are all different.

17. The arrangement of claim 13 wherein said regulating device (14) determines an overspeed condition by measuring a turbocharger speed.

* * * * *